United States Patent
Ward

(10) Patent No.: US 11,459,261 B2
(45) Date of Patent: Oct. 4, 2022

(54) PROCEDURE FOR OBTAINING AND IMPROVING PUMPABILITY OF HIGH TO VERY HIGH BIOSOLIDS CONTAINING DEWATERED SEWAGE SLUDGE

(71) Applicant: LYSTEK INTERNATIONAL CORP., Cambridge (CA)

(72) Inventor: Owen Patrick Ward, Waterloo (CA)

(73) Assignee: Lystek International Corp., Cambridge (CA)

( * ) Notice: Subject to any disclaimer, the term of this patent is extended or adjusted under 35 U.S.C. 154(b) by 9 days.

(21) Appl. No.: 16/620,686

(22) PCT Filed: Jun. 15, 2018

(86) PCT No.: PCT/CA2018/050726
§ 371 (c)(1),
(2) Date: Dec. 9, 2019

(87) PCT Pub. No.: WO2018/227304
PCT Pub. Date: Dec. 20, 2018

(65) Prior Publication Data
US 2020/0140349 A1    May 7, 2020

(30) Foreign Application Priority Data
Jun. 15, 2017   (GB) ..................... 1709541

(51) Int. Cl.
*C02F 11/12*   (2019.01)
*C02F 11/18*   (2006.01)
(Continued)

(52) U.S. Cl.
CPC .............. *C02F 11/12* (2013.01); *C02F 11/18* (2013.01); *C05F 7/00* (2013.01); *C05G 5/20* (2020.02)

(58) Field of Classification Search
CPC .. C05F 7/00; C02F 11/12; C02F 11/18; C02F 11/13; C02F 11/14; C02F 11/145; C02F 7/00; C05G 5/20; Y02A 40/20
See application file for complete search history.

(56) References Cited

U.S. PATENT DOCUMENTS 5,013,458 A * 5/1991 Christy, Sr. ............... C02F 1/02
                                                    210/764
5,294,693 A * 3/1994 Egraz .................. C08F 290/062
                                                    526/310
(Continued)

FOREIGN PATENT DOCUMENTS

CA       2343186        5/1999
CA       2656390 A1     8/2010
(Continued)

OTHER PUBLICATIONS

Helmenstine ("What is Caustic Soda and Where Can You Get It?", 2021, accessed from thoughtco.com) (Year: 2021).*

(Continued)

*Primary Examiner* — Jennifer A Smith

(57) ABSTRACT

A procedure for producing a liquid fertilizing product from a biosolids cake that has been de-watered to a biosolids content of 18% or more. The procedure includes positioning a process amount of the biosolids cake in a reactor vessel, heating the biosolids cake process amount, and adding a quantity of an alkali and mixing it into the process amount of the biosolids cake to form a reactor mixture. The reactor mixture incubated for a period, and then cooled. The alkali includes pH-raising and hydrolysis-procuring components. The quantity of alkali in relating to the biosolids process amount is sufficient that a residual amount of the alkali remains in the cooled reactor mixture, the pH of the reactor (Continued)

Table-Effect of alkali, incubation temp/time and biosolids concentration on product viscosity

| No | Cal85/MT Cake (24%) | Mixture | Incubation Temp C | Time hold | Water added after incubation | Biosolids Concentration | Total Solids Conc | Viscosity in storage after 1d | 2d | pH1d | Line |
|---|---|---|---|---|---|---|---|---|---|---|---|
| 1 | 40Kg | Mix 1.0 Kg Cake + 40.0g Cal85 +9g KCl Add 157.5g Mix per Jar | 95C | 8 | 0 | 24% | 29% | 4829 | 5051 | 12 | 1 |
| 2 | | | | 16 | | | | 4025 | 4211 | 11.9 | 2 |
| 3 | | | | 24 | | | | 3071 | 3473 | | 3 |
| 4 | | | 75C | 8 | Water added to dilute cake to 21%BS (13ml) | 21% | 25.4 | 5897 | 9338 | 12 | 4 |
| 5 | | | | 16 | | | | 4649 | 5087 | 12.1 | 5 |
| 6 | | | | 24 | | | | 4151 | 4277 | | 6 |
| 7 | | | 85C | 8 | | | | 4295 | 4829 | 12 | 7 |
| 8 | | | | 16 | | | | 3149 | 3251 | 12.1 | 8 |
| 9 | | | | 24 | | | | 2543 | 3047 | | 9 |
| 10 | | | 95C | 8 | | | | 2837 | 3047 | 12 | 10 |
| 11 | | | | 16 | | | | 1848 | 1596 | 12.1 | 11 |
| 12 | | | | 24 | | | | 1734 | 2004 | | 12 |
| 13 | 30Kg | Mix 1.0 Kg Cake + 30.0g Cal85 +9g KCl Add 156.5g Mix per Jar | 95C | 8 | 0 | 24% | 28% | 220000 | | 10.1 | 13 |
| 14 | | | | 16 | | | | 86280 | | 10 | 14 |
| 15 | | | | 24 | | | | nd | | 10 | 15 |
| 16 | | | 75C | 8 | Water added to dilute cake to 21%BS (13ml) | 21% | 24.5 | 112000 | | 10.2 | 16 |
| 17 | | | | 16 | | | | 113000 | | 9.9 | 17 |
| 18 | | | | 24 | | | | 111000 | | 9.9 | 18 |
| 19 | | | 85C | 8 | | | | 89880 | | 10.1 | 19 |
| 20 | | | | 16 | | | | 86080 | | 9.9 | 20 |
| 21 | | | | 24 | | | | 49000 | | 9.9 | 21 |
| 22 | | | 95C | 8 | | | | 27000 | | 10.1 | 22 |
| 23 | | | | 16 | | | | 28790 | | 9.9 | 23 |
| 24 | | | | 24 | | | | 84000 | | 9.9 | 24 |

Note: KCl is included as an additional but non-process element.

mixture remains at a saturation level during and after the incubation period, and the cooled reaction mixture is pumpable.

2 Claims, 2 Drawing Sheets

(51) Int. Cl.
 *C05F 7/00* (2006.01)
 *C05G 5/20* (2020.01)

(56) References Cited

U.S. PATENT DOCUMENTS

| | | | |
|---|---|---|---|
| 6,395,516 B1 * | 5/2002 | Nienow | B01F 7/00158 366/318 |
| 2003/0201226 A1 * | 10/2003 | Kelly | A61L 2/10 210/609 |
| 2007/0084804 A1 * | 4/2007 | Buckholtz | C02F 11/004 210/764 |
| 2008/0006585 A1 * | 1/2008 | Woodruff | C02F 11/145 210/749 |
| 2011/0091953 A1 * | 4/2011 | Bolin | C12P 5/023 435/167 |

FOREIGN PATENT DOCUMENTS

| | | |
|---|---|---|
| CA | 2693010 A1 | 8/2010 |
| CA | 2932869 A1 | 12/2016 |

OTHER PUBLICATIONS

Environmental Regulations and Technology ("Control of Pathogens and Vector Attraction in Sewage Sludge", 2003, accessed from epa.gov) (Year: 2003).*

Smith, Karen A., Lori E. Goins, and Terry J. Logan. "Effect of calcium oxide dose on thermal reactions, lime speciation, and physical properties of alkaline stabilized biosolids." Water environment research 70.2 (1998): 224-230. (Year: 1998).*

Wikipedia. "Sodium Hydroxide"Wikimedia Foundation, Mar. 11, 2016, <https://en.wikipedia.org/wiki/Sodium_hydroxide> (Year: 2016).*

LabChem. "Sodium Hydroxide, 50% w/w/" Safety Data Sheet. Feb. 7, 2017 (Year: 2017).*

Acting Colleges "How do you calculate pH from KOH" 2021 <https://actingcolleges.org/library/acting-questions/read/41759-how-do-you-calculate-ph-from-koh> (Year: 2021).*

International Search Report dated Aug. 17, 2018 for International Patent Application No. PCT/CA2018/050726.

Written Opinion of the International Searching Authority dated Aug. 17, 2018 for International Patent Application No. PCT/CA2018/050726.

International Preliminary Report on Patentability dated Aug. 9, 2019 for International Patent Application No. PCT/CA2018/050726.

Garvey et al., "Biosolids Hydrolysis Process and High Solids Liquid Fertilizer Reduce Land Application Costs and Complies With Nutrient Management Regulations" WEFTEC 2016, Jan. 3, 2016 (Jan. 3, 2016)—figure 1.

* cited by examiner

Table-Effect of alkali, incubation temp/time and biosolids concentration on product viscosity

| No | Cal85/MT Cake (24%) | Mixture | Incubation Temp C | Time hold | Water added after incubation | Biosolids Concentration | Total Solids Conc | Viscosity in storage after..... | | pH1d | Line |
|---|---|---|---|---|---|---|---|---|---|---|---|
| | | | | | | | | 1d | 2d | | |
| 1 | 40Kg | Mix 1.0 Kg Cake + 40.0g Cal85 +9g KCl | 95C | 8 | 0 | 24% | 29% | 4829 | 5051 | 12 | 1 |
| 2 | | | | 16 | | | | 4025 | 4211 | 11.9 | 2 |
| 3 | | | | 24 | | | | 3071 | 3473 | | 3 |
| 4 | | | 75C | 8 | Water added to dilute cake to 21%BS (13ml) | 21% | 25.4 | 5897 | 9338 | 12 | 4 |
| 5 | | | | 16 | | | | 4649 | 5087 | 12.1 | 5 |
| 6 | | | | 24 | | | | 4151 | 4277 | | 6 |
| 7 | | | 85C | 8 | | | | 4295 | 4829 | 12 | 7 |
| 8 | | | | 16 | | | | 3149 | 3251 | 12.1 | 8 |
| 9 | | | | 24 | | | | 2543 | 3047 | | 9 |
| 10 | | Add 157.5g Mix per Jar | 95C | 8 | | | | 2837 | 3047 | 12 | 10 |
| 11 | | | | 16 | | | | 1848 | 1596 | 12.1 | 11 |
| 12 | | | | 24 | | | | 1734 | 2004 | | 12 |
| 13 | 30Kg | Mix 1.0 Kg Cake + 30.0g Cal85 +9g KCl | 95C | 8 | 0 | 24% | 28% | 220000 | | 10.1 | 13 |
| 14 | | | | 16 | | | | 86280 | | 10 | 14 |
| 15 | | | | 24 | | | | nd | | 10 | 15 |
| 16 | | | 75C | 8 | Water added to dilute cake to 21%BS (13ml) | 21% | 24.5 | 112000 | | 10.2 | 16 |
| 17 | | | | 16 | | | | 113000 | | 9.9 | 17 |
| 18 | | | | 24 | | | | 111000 | | 9.9 | 18 |
| 19 | | | 85C | 8 | | | | 89880 | | 10.1 | 19 |
| 20 | | | | 16 | | | | 86080 | | 9.9 | 20 |
| 21 | | | | 24 | | | | 49000 | | 9.9 | 21 |
| 22 | | Add 156.5g Mix per Jar | 95C | 8 | | | | 27000 | | 10.1 | 22 |
| 23 | | | | 16 | | | | 28790 | | 9.9 | 23 |
| 24 | | | | 24 | | | | 84000 | | 9.9 | 24 |

Note: KCl is included as an additional but non-process element.

Fig. 1

Table-Effect of alkali, incubation temp/time and biosolids concentration on product viscosity

| Treatment No | Cal8 5Kg/MT 24% Cake | Incubation Temp C 95/20hours ** | Undiluted BS (24%BS)* | | | | Biosolids Concentration | | | | | | | pH1d (1 day) |
|---|---|---|---|---|---|---|---|---|---|---|---|---|---|---|
| | | | Viscosity | | | | Diluted to 22%BS* | Diluted to 20%BS* | Diluted to 18%BS* | Diluted BS %In Brackets | | | | |
| | | | After 2h cps | After 18h cps | Increase in Viscosity over 18h | | | | | Viscosity | | | | |
| | | | | | cps | % | | | | 2h after dilution cps | | | 18h after dilution cps | Increase in viscosity over 18h | |
| | | | | | | | | | | | | | | cps | % | |
| 1 | 40Kg | | 4601 | 4900 | 299 | 6.5 | 2190 | ------→ | ------→ | 2519(22%) | 329 | 12 | 11.5 |
| 2 | 38 | | 8478 | 18000 | 9522 | 112 | 3263 | ------→ | ------→ | 3713(22%) | 450 | 14 | 11.2 |
| 3 | 36 | | 11090 | 28130 | 17040 | 154 | 3959 | ------→ | ------→ | 4331(22%) | 372 | 9 | 11.0 |
| 4 | 34 | | 49640 | 113400 | 63760 | 128 | 5615 | ------→ | ------→ | 8498(22%) | 2883 | 51 | 10.7 |
| 5 | 32 | | 88600 | 175000 | 86400 | 98 | 5933 | ------→ | ------→ | 9088(22%) | 3155 | 53 | 10.6 |
| 6 | 20 | | Infinity | Infinity | NA | NA | 390000 | 183000 | 5399 | 9900(18%) | 4500 | 83 | 8.5 |
| 7 | 15 | | Infinity | Infinity | NA | NA | Infinity | 79480 | 5549 | 10500(18%) | 4951 | 89 | 8.5 |
| 8 | 10 | | Infinity | Infinity | NA | NA | Infinity | 134000 | 5777 | 10970(18%) | 5193 | 90 | 8.1 |
| 9 | 5 | | Infinity | Infinity | NA | NA | Infinity | Infinity | 5837 | 11490(18%) | 5653 | 97 | 8.2 |
| Column Number | 1 | 2 | 3 | 4 | 5 | 6 | 7 | 8 | 9 | 10 | 11 | 12 | 13 |

* Estimated total solids of mixture of 24% BS +40Kg Cal85/MT: ~27%

** The mixture is incubated at 95°C for 20 hours and then mixed to a homogeneous state for 1 minute while hot

Fig. 2

PROCEDURE FOR OBTAINING AND IMPROVING PUMPABILITY OF HIGH TO VERY HIGH BIOSOLIDS CONTAINING DEWATERED SEWAGE SLUDGE

CROSS-REFERENCES TO RELATED APPLICATIONS

This application is a US National Phase Application of International Patent Application No. PCT/CA2018/050726, filed on Jun. 15, 2018, which claims priority to UK Patent Application No. 1709541.5, filed on Jun. 15, 2017, both of which are hereby incorporated by reference in their entirety.

BACKGROUND

Raw sewage is the mix of water and wastes from domestic, commercial and industrial life that are flushed into the sewer. These wastes include both biologically and inorganically derived solids, semi-solids, semi-liquids and liquids.

Raw sewage is treated to retrieve the water that the waste process and sewering put into it. This is often conducted in treatment plants (with 1 or more stages) whereby the water is separated and cleaned so that it may be safely reused. This step in the treatment process is often a mechanical or chemical/mechanical dewatering conducted at or near the $1^{st}$ accumulation point for the raw sewage.

Once the water is removed to one degree or another, the remainder from the process is herein termed 'sewage sludge'. This sewage sludge is often a dry cake-like material having many of the characteristics of a solid or semi-solid.

This cake can then be further treated or processed into a useful biosolids material referred to by the USEPA as "They (biosolids) are nutrient-rich organic materials resulting from the treatment of domestic sewage in a treatment facility. When treated and processed, these residuals can be recycled and applied as fertilizer to improve and maintain productive soils and stimulate plant growth."

The cake is a broad spectrum material containing many types and quantities of reactants. These materials cannot be expected to be entirely fixed in time or quantity. These materials neither can be expected to have instant reactions with any process, alkali driven or not.

This application relates to the manner of processing of de-watered sewage and cake.

Solids Content, Transportation and Pumbability

For ease of transporting sewage sludge that has been treated and is ready for disposal, the sludge should be:
 (a) dewatered such that the water content of the sludge is low (i.e the solids content is high) and
 (b) of such a low viscosity that the sludge is (economically) pumpable—e.g for transport of the sludge for disposal, being applied to farm-fields, etc. These two parameters, i.e. high solids-content and low viscosity, of course, conflict.

Most often raw sewage sludge has a solids-content of around three percent, by weight. Thus, in a tonne of raw sewage, 30 kg is solids, and 970 kg is water. At the sewage treatment plant, the raw 3%-sewage is dewatered. Simple dewatering (in which the water is basically squeezed out of the sludge, mechanically) is effective to remove a great deal of the water content of the sludge (i.e is effective to increase the solids content). Simple squeezing can be effective to increase the solids content to around 10 or 15%. Centrifuging is effective to increase the solids content to e.g 20%, or even higher. The upper limit of (economical) mechanical dewatering may be considered to be about 25%-solids.

After dewatering to 10% solids, the 30 kg of solids in the initial tonne of raw 3%-sewage, now is accompanied by only 270 kg of water (the other 700 kg of water having been squeezed out). After dewatering to 25% solids, the 30 kg of solids now is accompanied by only 90 kg of water (i.e at 25%-solids, 880 kg or 91% of the water content of the raw 3%-sludge has been squeezed out). Untreated sewage sludge that has been dewatered to 15% solids or more, typically, is stiff and dry and cake-like. Untreated 15%-cake and above is quite unpumpable—and a measurement of its viscosity is largely meaningless.

For easy pumpability of sewage sludge, its viscosity should be 6,000 centiPoise or less. However, sludge close to 10,000 cP is still just about pumpable (e.g at increased pumping pressures), but 10,000 cP should be regarded as the upper limit of viscosity for pumpability. Above that, the sludge is basically unpumpable. In more detail: for present purposes, sludge at 6,000 cP or less is easily pumpable; sludge between 6,000 and 8,000 cP is pumpable, but not so easily or economically; sludge between 8,000 and 10,000 cP is pumpable, but only with difficulty and increased cost; and sludge above 10,000 cP is basically unpumpable.

Terminology

Prior Art

There are traditional treatment technologies for lowering the viscosity of dewatered sewage sludge and cake. The most conventional approach is to raise the temperature to about 160-180 C in a pressure reactor over a period of time of reaction. Other methods involve additionally raising the pH of the sludge.

For instance, alkali, when added to sludge during thermal treatment, raises the pH of the sludge and promotes hydrolysis reactions that break down the biological materials in the sludge.

It is understood generally that:
 (a) the higher the temperature and pH of the sludge during this thermal treatment, the greater the disruption of the sewage sludge and the greater the rate of disruption of that sludge, also
 (b) the greater the disruption of the sludge, the lower the viscosity of the resulting sludge.

Thus, in (perhaps over-)simplified terms, it is generally understood that the lowest viscosity is procured when the sludge is raised to the highest temperature and the highest pH.

It is also understood that there is a diminishing-returns effect, in that, when the temperature and pH have been raised to high levels, the viscosity-lowering effect of a further incremental raise is smaller than the viscosity-lowering effect of the same incremental raise at the lower levels.

It is also understood that in process terms the pH of the reactor-sludge body drops slowly over the time required for reaction.

Another is to process relatively dry dewatered cake having a biosolids content of about 15% or less at atmospheric pressure by a combination of an increased temperature less than 100 degrees C., and raising the pH accompanied by violent mechanical shearing. In many cases, this 15% biosolids material must be obtained by adding water back in to a dewatered cake with a higher level of biosolids, considered a workable but necessary action to process the cake into a pumpable material.

Although effective for purpose, this process is not known for effectively processing high solids cake of 18-24% biosolids into a pumpable liquid without adding water back in to the input material so as to reduce its solids content back to less than 15%. This counter productive step of adding water after transport to process input material after that material was originally de-watered to a high level before transport adds cost and complexity which could not, in the prior art, be effectively overcome in an economical industrial process.

Adding alkali to sludge is effective to raise the pH of the sludge, and the elevated pH (and the elevated temperature) procure and promote hydrolysis breakdown reactions. The pH-raising component (e.g the hydroxide) from the added alkali becomes depleted during the breakdown reactions, whereby the fact of hydrolysis breakdown tends to lower the pH. As the pH goes down, the vigorous rate at which the hydrolysis breaks down the sludge also goes down.

In known processes since the hydrolysis reaction uses up the hydroxide in reaction with the biological materials over a period of time (reaction time) which may proceed at different rates depending on the components of the cake and the process parameters, whereby the pH of the sludge gradually decreases during hydrolysis, when all the hydroxide in the sludge has been used up or the reaction is complete, or both, the pH of the sludge basically stops falling.

OBJECTS OF THE INVENTION

An aim of the present technology is to provide a new and more cost-effective way of treating high-solids sewage sludge, cakes, particularly those cakes with a solids-content of about 18-24% {herein referred to as 'very-high-solids cake, VHS-cake'} to lower their viscosity and more efficiently produce a useful biosolids product and, more particularly a liquid fertilizing product.

Another aim of the present technology is to supersede the traditionally-expected diminishing-increment effect.

Since the bio-solids component of untreated sewage sludge includes mainly-intact biological cells and other biological structures it is an objective, in order to lower the viscosity of VHS-cake, to disrupt or break down the cells and biological structures of the biosolids, thereby releasing the substances thereof—including water bound up in the waste.

It is a further objective to obtain a large jump in the extent to which the viscosity of cake, and particularly VHS-cake, can be lowered without the use of mechanical shearing or complex pressure vessels technology.

A yet further objective is to more efficiently harness hydrolysis reactions to create a greater and more vigorous degree of disruption hydrolysis in complex biological materials and the cellular and other structures within the cake, and particularly, VHS-cake than has been done traditionally. In order to achieve a maximum lowering of the viscosity of cake-like sludge, designers should aim to hydrolyze (and thereby break down) at least most of the biological material in the sludge that can be broken down by hydrolyzation sufficiently to reduce the viscosity of the dewatered sludge, cake, to the degree that renders it easily pumpable.

A still further objective is to provide for vigorous hydrolization of the main targets of opportunity throughout the reaction process from initialization through to long-term vigorous effects on slower-to-react components of the cake which might well be those things which are more toxic or harder to eliminate such as strongly resistant biologics, such as bacteria and viruses, medical and food chemicals, hormones, metals, pesticides etc etc.

THE INVENTION

The invention provides a procedure for the production of a liquid fertilizing product from a solid Biosolids Cake that has been de-watered to a total Biosolids continent of 18% or more, comprising receiving a process amount (SM kg) of the solid Biosolids cake into a reactor vessel, and thermally treating the biosolids cake process amount by raising its temperature to RT degrees centigrade, and adding a quantity of an alkali and mixing it in to the process amount of the Biosolids cake to form a reactor mixture, and, incubating the reactor mixture for a period of hours, and cooling the reactor mixture, and, the alkali contains a hydroxide, or other pH-raising and hydrolysis-procuring component whereby:
  i. the quantity of alkali in relation to the process amount ensures that:
    A. a residual amount of the alkali remains in the cooled reactor mixture, and
    B. the pH of the reactor mixture remains at a saturation level during and after the incubation period, and,
  ii. the viscosity of the reaction mixture is so low that the cooled reaction mixture is a pumpable liquid.

The invention also provides a procedure wherein the mixing and incubating steps do not include sustained violent mechanical shearing of the process amount.

The invention further provides a procedure wherein the pH of the reactor mixture remains at a saturation level during and preferably during the whole of the incubation period, and the cooling down period and more preferably both.

The invention also provides a procedure wherein the procedure also includes the mixing in addition of water during or after the incubation period, or the cooling period, or both.

The invention also provides a procedure wherein the addition of water provides that the viscosity of the reactor mixture is so low that the cooled reactor mixture is a pumpable liquid.

The invention further provides a procedure wherein the temperature RT is less than 100 degrees centigrade and in the range of one of 65 degrees centigrade or more, 75 degrees centigrade or more or 95 degrees centigrade or more.

The invention further provides a procedure wherein the incubation time RP is 8 or more hours, 16 or more hours, or 24 or more hours.

The invention further provides a procedure wherein the addition of water by mixing reduces the biosolids concentration by no more than 4% or no more than 6%.

The invention also provides a procedure wherein the viscosity of the reactor mixture is evaluated as a pumpable liquid upon completion of the procedure and again periodically for periods of hours and days and wherein the water may be added or the procedure repeated to produce and maintain a pumpable liquid.

The present technology adds and mixes an excess of alkali to the cake-like sludge in the reactor, as a component of the thermal treatment of the cake. In the new treatment procedure the alkali is present in large enough quantity that the hydroxide is never exhausted.

Most preferably, so much hydroxide is present and available to the sludge during the thermal treatment that:
  (a) the pH of the sludge remains at or very near its maximum level of pH, even though hydrolysis reactions are proceeding with maximum vigour, and, (b) the hydrolysis reactions continue, at a maximum rate, until substantially all the hydroxide has gone. The reactions continue because, as hydroxide is used up, more hydroxide simply enters the sludge as by dissolution and replaces the used-up hydroxide in a time-release fashion—so the hydrolysis reactions keep going at a maximum rate.

A preferred embodiment would provide full pH saturation at all relevant times, before, during and after heating and cooling steps.

By this process biosolids cake, and particularly VHS-cake, is efficiently rendered pumpable over the required reaction period, including any necessary cool-down period.

Even after sufficient of the biosolids material of the dewatered cake has been broken down to render it easily pumpable, the technicians preferably should see to it that there is enough hydroxide left in the sludge to keep and maintain the pH of the now-treated sludge at more or less the saturated level.

In the present technology, when the majority of hydrolizable biosolids have disappeared from the sludge, the pH of the sludge then tends to remain at a high level over a storage period of a few months. (In fact, a low rate of gradual drop-off of pH can be expected, in high-pH stored sludge, due to natural processes.)

However, if it happens that the pH does in fact fall well below the saturation level—for example, down to 10.5-pH or lower, that is an indication that the hydroxide content of the sludge has fallen below the saturation level, and that hydrolyzable material is present in the sludge but that hydrolysis has slowed to a large extent. When the pH-level in the sludge drops to 10.0-pH (or a little below), that is an indication that there is an insignificant amount of hydroxide left in the sludge, and yet there may be an amount of hydrolyzable biosolids left in the sludge.

For instance, in the case of calcium hydroxide, a relatively available and inexpensive alkali and given the limited solubility of this hydroxide, only so much of the added hydroxide can react in the initial mixture with the cake and/or dissolve in the process water. Any added excess hydroxide (meaning excess over that amount required for immediate purposes) remains unreacted and undissolved. In the present technology, the designers provide such an excess of alkali that, as the dissolved hydroxide is used up over portions of the reaction period, so some of the excess can now enter the reaction. Thus, the pH of the sludge maintains itself throughout the thermal-treatment at the (very high) pH level of the saturated solution of the calcium hydroxide. This saturated pH level ideally could be 12.4-pH, and during actual commercial treatment using the present technology, the pH of the sludge can be maintained typically around 11.9-pH or 12.0-pH throughout the thermal treatment and, preferably, also throughout any cool down period.

All of the required excess hydroxide can be added at the start of the thermal treatment, or increments of alkali can be added as the treatment is ongoing. By monitoring pH, temperature and viscosity, as by mixing load, the process may be monitored and controlled, particularly the pH and the temperature as they are interdependent and the pH may drop to a lower saturation level or below saturation for periods during the procedure.

Elevated temperature in the reactor is effective to speed up the hydrolysis reactions, preferably less than the pressure vessel limit of about 100 degrees C. The high temperature means the procedure moves to achieve completion of the hydrolysis breakdown reactions in a speedy manner, under control when necessary or advisable.

A similar reaction is obtained when using more expensive but more soluble hydroxides such as potassium hydroxide or sodium hydroxides which are each mixed in to the process cake in the reactor in quantities sufficient to reach a pH saturation level and maintain at least a saturation level over a reaction period with added temperature through the reaction period.

Operational Details

Some operational details of the new treatment procedure will now be described.

The present sludge treatment procedure can be controlled by monitoring the pH of the sludge until the required degree of pumpability has been achieved.

The operators should keep an excess of alkali hydroxide present in the reactor, and when the pH of the sludge starts to drop below, say, 11.5-pH, ie dropping, and there is no longer an excess of undissolved hydroxide available and ready to enter the reaction, that observation should be interpreted to mean that the majority of the biosolids that can be hydrolyzed, have not been hydrolyzed, and the treatment procedure should be continued by adding to the alkali in the reactor.

The fact of a substantial drop in the pH of the sludge informs the operators that hydrolysis has stopped, or drastically slowed down. The drop in pH might indicate that more alkali needs to be added in order to create, once more, the required excess of alkali as above—or, the drop in pH to a fixed level might indicate that all the biosolids that are amenable to hydrolysis have been hydrolyzed, and treatment may be stopped. Operators can tell the difference between the two conditions in that, if all the material amenable to hydrolysis by this process has been hydrolyzed, there will be an excess of undissolved alkali remaining in the sludge.

If pH of the sludge drops to 10.0, that indicates essentially that all the available hydroxide has entered the hydrolysis reaction (as by dissolution in the reactant) and all has been used up, but there still remains some hydrolyzable biosolids structures amendable to hydrolysis by this process in the sludge. Presumably, this error situation would not arise during the thermal treatment phase of the procedure, but it might happen during the cool-down phase. Whenever the pH falls this low, whether the sludge is being heated to maintain its treatment temperature, or is being allowed to cool down, the 10.0-pH level indicates that essentially all the alkali has all been used up, and yet there still remains some hydrolyzable material in the sludge. This situation should not happen with proper monitoring, but if it happens at all, it will probably happen during the cool-down phase.

It is an advantage if the cool-down phase of the procedure can be done while the sludge remains in the reactor. If it should be required to add more alkali during cool-down, having the sludge in the reactor means that the further alkali can be added, and the sludge can be re-heated, and stirred, if necessary. Better still, of course, is for the system-designers and the plant operators to ensure that the status of the added alkali is that there is an excess of unreacted/undissolved alkali during both the energetic thermal treatment and during cool-down. It is best to keep the hydrolysis reactions going at full vigour over the whole period of the procedure.

Most preferably, the pH of the reactant is high for storage purposes.

EXAMPLES

Some examples of procedures that embody the present technology will now be described.

The incoming sludge to be treated is placed in the reactor-vessel, which includes facilities for:
(a) adding alkali substances to raise the pH of the sludge in the reactor;
(b) stirring and mixing the sludge (and the alkali) in the reactor;
(c) heating the contents of the reactor to a treatment-temperature; and
(d) incubating the contents of the reactor at that treatment-temperature for an incubation-period of time.

The following are some definitions of the sludge during different stages of treatment:
(a) incoming dewatered sludge: sludge that has been dewatered (e.g to 20%-solids) and is about to be placed in the reactor.
(b) reactor sludge: sludge that is in the reactor, and is undergoing treatment, where the treatment includes:
 i. incubation at a high temperature for a period, and
 ii. addition of pH-raising substances into the sludge.
(c) hot-reactor-sludge: sludge that is in the reactor, has been heated to the treatment temperature, and is currently undergoing prolonged incubation.
(j) warm-sludge: sludge that is no longer receiving heat input, and is cooling down.
(k) W-hrs-warm-sludge: sludge that has not received heat input for W-hours, but is still above ambient temperature.
(f) cold-sludge: sludge that has cooled substantially to ambient temperature.
(g) C-hrs-cold-sludge: sludge that cooled to ambient temperature C-hours ago.
(h) storage sludge: treated sludge that has been placed in storage.
(i) final sludge: treated sludge that is ready for transport away from the treatment plant for disposal in a manner that requires the viscosity of the sludge to be lower than 10,000 cP—e.g by being applied to farm-fields.

System-designers might prefer the sludge to remain in the reactor-vessel during cool-down, or might prefer that the sludge be removed from the reactor-vessel and e.g placed in a cool-down vessel. Preferably, the cool-down vessel should have facility for stirring the sludge during the cool-down period. After cool-down, the sludge may be stored e.g in storage-vessels, while awaiting transport out of the plant, and disposal. In some climates, the treated sludge might need to be stored over the winter. The high final pH is advantageous in that case in preventing bacteria from establishing viable colonies in the stored sludge.

System-designers will usually prefer that no further treatment will be done to the sludge once the heater has been turned off. However, subjecting already-treated sludge to thermal-treatment a second time is not ruled out; but once-through treatment is more economical.

In the new technology, the technicians provide enough of an excess of alkali that the hydrolysis continues until all the potential for hydrolysis by this process, in the sludge, has been used up.

Adding water to sludge, of course, lowers the viscosity of the sludge. But it is not economical to have to add water to stiff sludge in order to make it pumpable. For example, suppose the systems-designers needed to add water to sludge in order to bring the solids-content down from 20% to 15%: now, for every tonne of 20%-solids sludge (being 200 kg of solids in 800 kg of water) the operators would need to add 333 kg of water—which is 42% of the 20%-solids water-content. Besides, adding water to dewatered sludge is contra-indicated, given the cost of dewatering and rewatering.

In the new technology, adding the extra quantity of alkali would not require a capital cost increase, assuming that the plant facility for adding alkali into the reactor already exists. Of course, the extra alkali itself costs money. Similarly, raising the temperature of the sludge in the reactor would not require a capital cost increase.

If the system-designers were to require that the sludge be raised to a temperature higher than 100° C., now the reactor-vessel must have facility for raising the reactor pressure above atmospheric, i.e the reactor must be a pressure vessel—which is a considerable capital cost increase over an atmospheric vessel.

One of the benefits of the present technology is that it enables the final sludge to have a low enough viscosity to be pumpable, and yet the sludge (usually) does not need to be heated beyond 100° C. and the input material is a high to very high solids content cake.

It may be noted that a reactor vessel capable of heating sludge to 120° C. involves a further step-up in capital costs (and also involves considerably-increased operational costs), mainly because of stringent regulations for high-pressure vessels.

Of course, if the particular plant is already equipped with a reactor vessel that is capable of being pressurized, and which therefore can heat sludge above 100° C. (or above 120° C.) of course the operators will be happy to use that. Going to the higher temperatures can be useful—not least in speeding up the hydrolysis reactions.

Raising the temperature of the sludge above 100° C. is not ruled out in the new technology, if the gains outweigh the drawbacks. But a major aim of the new procedure is to enable atmospheric reactors to be used in applications where traditionally the reactor had to be a pressure vessel, or a high-pressure vessel.

When the alkali is lime—given the solubility of lime—the pH of the sludge when the sludge is saturated with dissolved lime is in the area of 12.0 to 12.4-pH. Sewage sludges will vary in composition and hence the amount of alkali required to achieve a particular pH target will vary. One metric ton of a typical dewatered biosolids sludge after anaerobic digestion having a solids content of 24% (ie a sludge having a dry mass of 240 Kg may require 40 Kg of Cal85 lime (contains 85% calcium oxide) or equivalent amount of hydroxide from other alkali sources to achieve sufficient hydrolysis to render the 24% biosolids sludge pumpable. That is to say that there is a sufficient excess of undissolved lime to maintain the dissolved lime at a saturated concentration (reflected by a pH of 12-12.4) over the course of the hydrolysis reaction required to render the 24% biosolids sludge pumpable. The pH of the reactor-sludge indicates the status of the hydrolysis breakdown reactions taking place in the reactor-sludge. The pH scale being a log 10 scale, the concentration of OH at pH-10.0 is only one hundredth of the concentration at pH-12.0. So, in dropping to 10.0-pH, only 1% of the OH concentration at 12.0-pH now remains. In other words, at 10.0-pH, the hydrolysis-procuring hydroxide has (nearly) all been used up. The fact of the drop to 10.0-pH indicates that there are still some hydrolyzable biosolids in the sludge, but there is now no hydroxide available to break them down.

The high to very high biosolids sludge may be subjected to thermal treatment in the reactor-vessel on a batch basis—by placing a batch of the sludge to be treated in the empty reactor-vessel, subjecting that batch of sludge to the thermal treatment, then cooling that batch of sludge to ambient. Or, the reactor-sludge may be subjected to thermal treatment in the reactor-vessel on a continuous-throughput basis—by feeding the (cold) incoming sludge into the reactor at a steady flow-rate, allowing the incoming sludge to be heated to the treatment temperature, and to be incubated at that temperature for the treatment period. In continuous-throughput treatment, probably the designers would arrange for the incubated sludge then to discharge (at the same steady flow-rate) into a separate cool-down vessel.

In the various examples of treatment procedures that are depicted herein, the treatment was done on a batch basis. The mass figures can be regarded as being applicable to continuous-throughput treatment, by regarding e.g a quoted mass of X kg of alkali, or Y tonnes of total sludge, etc, as being a mass throughput rate, measured as X kg/hr, or Y tonnes/day, etc—the units being consistent over all the mass figures, of course.

The reactor-sludge is incubated in the reactor, at the treatment temperature, for an incubation-period of time. In the examples, this time was between 8 hours and 24 hours, but experience with a particular sludge might indicate that the incubation-period for that sludge can and should be outside that range. The technicians may determine a preferred incubation-period for a particular sludge by laboratory testing of samples, e.g at different incubation-periods, different temperatures, different concentrations of alkali, and so on.

The alkali should preferably be added into the reactor-vessel early on in the thermal treatment. The alkali may be added after the reactor-sludge has been brought up to the treatment-temperature, or before heating commences. Preferably, the sludge is at the high pH levels throughout the incubation period (and throughout the cool-down period).

However, the system-designers might prefer to include a period in which the reactor-sludge is just heated to the treatment temperature, the addition of the alkali being left until later. High temperature, just by itself, is effective to promote the hydrolysis breakdown reactions—although not nearly so effectively as the combination of high pH and high temperature. It may be regarded that the main effect of raising the temperature is to increase the vigour with which the alkali procures the hydrolysis breakdown reactions. Generally, the vigour and the rate at which the hydrolysis reactions proceed is maximized when the sludge is very hot and very alkaline. In the examples, the best results can be attributed to the combination of pH levels in the region of 12 pH with temperatures just under 100° C. (and the temperatures might advantageously be set higher still, if the reactor-vessel is a pressure vessel).

Raising the pH is generally considerably more expensive than raising the temperature, and it might be found that using just temperature to procure breakdown of at least some of the biosolids (enabling the required overall amount of alkali to be reduced) is a good strategy from the standpoint of cost.

The added alkali should preferably be mechanically stirred and mixed into the reactor-sludge during the thermal treatment, and preferably also during cool-down. The reactor-mixture need not be stirred continuously; the preference is that the ingredients of the reactor-mixture should be stirred often enough, and vigorously enough, to substantially even out differences and gradients of temperature and concentration of the ingredients within the reactor-mixture.

LIST OF FIGURES/DRAWINGS

FIG. 1 is a table that shows the results of treatment of samples of sludge.

FIG. 2 is a table that shows the results of treatment of other samples of sludge.

DESCRIPTION OF TABLED RESULTS

FIG. 1 is a table that shows the results of actual treatment of some samples of sludge. In sample 1 (rows 1 to 3) a input batch of sludge had been dewatered to 24% total solids content. The batch of sludge was placed in the reactor-vessel and heated to a treatment temperature of 95° C. An amount of alkali (Cal85, containing 85% calcium oxide) was added to the batch of sludge in the reactor and mixed in, the amount of the hydroxide being 4% of the amount of the batch of sludge, by weight. The total solids concentration of 29% corresponds to the solids concentration of the biosolids and chemicals (cal85+KCl) mixture.

In these sample tests, no further alkali was added to the sludge during treatment and no shearing beyond simple mixing occurred. Therefore, the 4% provided enough hydroxide to ensure that an excess of alkali was always present in the sludge throughout and after the thermal treatment, including cool-down. The high pH levels (12.0- and 11.9- pH) are shown in the right-most column, and the fact of these high pH levels indicates that sufficient of the hydrolyzable content of the sludge had been hydrolyzed, and that there was still an excess of undissolved alkali left in the sludge after the sludge was rendered pumpable.

In line 1, the thermal treatment went on for 8 hours. However, the fact that the pH was so high after 8 hours might indicate that the sludge was rendered easily pumpable some time before the end of the treatment. In lines 2,3, the thermal treatment went on for 16 and 24 hours on other samples of the same render sludge—since this was the same sludge, presumably sufficient of the hydrolyzable material in the sludge had again already been hydrolyzed to render it easily pumpable before the expiration of eight hours. The high pH levels still present after the longer thermal-treatment periods indicates that some excess of alkali was still present in the sludge at the end of those periods, confirming that indeed all the hydrolyzable material had been hydrolyzed to render it easily pumpable.

The final viscosities of the samples (around 6,000 cP) shows that the treated sludge was indeed in an easily pumpable state. It is emphasized that in the sample tests of rows 1-3, sludge that had been dewatered to 24% solids was liquefied, by a procedure according to the present technology, simply and inexpensively, to a viscosity that left the treated sludge having a total solids content of 29% well capable of being pumped with conventional pumping equipment.

The tests depicted in lines 4-12 show the results of varying some of the parameters. But in these cases, too, the fact of the high pH, in each result, indicates that enough excess alkali was added to the sludge (at the start of treatment) to ensure that sufficient of the hydrolyzable alkali was hydrolyzed to render it (easily) pumpable after a sufficient time of reaction. Again, since the final sludge was at the high pH levels, presumably the material was rendered (easily) pumpable in under 8 hours.

In commercial applications of the new procedure, the engineers should take steps to find out just how long it actually takes, in the particular case, to render the material (easily) pumpable, because they will wish to end the treatment shortly after that completion, for best economy. Also, alkali costs money, and the designers will wish to minimize the amount of the excess of alkali that needs to be provided in each case.

In the samples depicted in lines 13-24 of FIG. 1, it is clear that not enough alkali was added to the sludge. The pH had dropped right down to 10.0-pH when treatment was discontinued, indicating that the sludge had dissolved all the available alkali, and there was no more alkali to enter solution in the sludge—and yet, since the pH had dropped right down to the 10-pH level, there was still plenty of not-hydrolyzed, but hydrolyzable, biosolids material left in the sludge.

The fact of the incomplete hydrolysis-breakdown of the biological and cellular material is also indicated in rows 13-24 by the fact that the viscosities have not been lowered to anywhere near the levels sludge must have in order to be pumpable.

In FIG. 2, the only sample in which the viscosity is low enough for the sludge to be pumpable, is the sample depicted in line 1. Here, the sludge of the sample has been dewatered to 24% solids and the pumpable product of the process had a total solids content (including the added lime) of 27%. Again, in this sample, the amount of added alkali is enough to take the hydrolysis reactions right through to completion—as indicated by the high level of the final pH, being 11.5-pH. In fact, 11.5 is some way below 12.0, which might indicate that the excess added alkali had all been used up.

Regarding the sample in row 2, even though the amount of added alkali as not enough to provide enough excess of undissolved alkali to complete the hydrolysis, still the final pH is at 11.2, which is a good margin above the all-the-alkali-has-been-used-up level of 10.0-pH. This indicates that the conditions in the row 2 sample, while not perfect, are still close. A viscosity of 8478 cP indicates only marginal pumpability, but only a small improvement is required in that regard; and the amount of extra alkali needed to provide an excess of undissolved alkali at the end of the treatment procedure cannot be much higher than the amount actually provided in row 2.

However, the added alkali in row 2 was indeed too little. The rest of the samples (rows 3 to 9) confirm that the still smaller amounts of added alkali lead to progressively worse outcomes as regards viscosity.

It is again noted that, as depicted in row 1 of FIG. 2, the new treatment procedure was effective to efficiently and simply create a pumpable liquid having a total solids content of 27% starting from sludge that had been dewatered to 24% solids (and would therefore have been stiff cake, with no indication of containing any moisture at all).

The lower viscosities in columns 7 and 9 were achieved by diluting the sludges with added water.

Terminology

In this application the following are defined terms:

Solid in respect of sewage waste indicates a material which is firm and stable in shape, not a liquid or a fluid. A solid as defined herein does not slump appreciably under gravity alone during process-relevant periods of time at ambient or room temperature and atmospheric pressure.

Fluid in respect of sewage waste indicates a material which has no fixed shape and yields easily to external pressure; a liquid or a slurry. As such a slurry as defined herein slumps appreciably under gravity alone in process-relevant periods of time at ambient or room temperature and atmospheric pressure.

Bio-Solids Cake (BSC) is a solid sewage waste bulk material essentially unpumpable by commercial waste disposal methods at ambient or room temperature and atmospheric pressure which is the result of processing raw sewage waste through digesters and de-watering processes. Typically, Biosolids Cake at ambient temperature and atmospheric pressure is sticky and somewhat gel-like in some of its characteristics. Biosolids Cake contains at least 15-30% BioSolids (BS). Typical commercial de-watering of sewage waste produces Biosolids Cake in the range of 20-25% BioSolids. For the purposes of this patent application, Biosolids Cake is understood to also include undigested dewatered raw sewage.

Pumpable applies to Bio-Solids sewage waste material in slurry, suspension, fluid or liquid form which may be economically pumped. This is usually indicated by a viscosity of less than 6,000 cP (centi-poise) at ambient temperature and atmospheric pressure for typical industrial applications and equipment but which may be as much as 8-10,000 cP for more sophisticated process equipment.

Pumping includes pressure driven transfer of Biosolids waste material in slurry, suspension, fluid or liquid form. Pumping includes gravitational and fluid pressure flow as a mass.

De-watering Processes (DWP) include commercial processes which reduce the water content of processed sewage waste by mechanical means commonly at ambient temperature such as filtration, centrifugation and flocculation. DWP are principally directed at removal of Free Water.

Bio-Solids (BS) are the organic components of sewage waste which may be extracted from sewage waste in a solid form.

Evaluating includes both concurrent and non-concurrent measurement of or use of viscosity parameters, including plant, industrial and commercial operation in accordance with previously established viscosity parameters proven successful.

Viscosity as used herein is a measure of the resistance to gradual deformation of a fluid by shear or tensile stress at room ambient temperature and atmospheric pressure as measured in centiPoise (cP).

Shearing as used herein applies to a more aggressive application of mixing in that the objective of mixing in this invention is to facilitate the hydrolysis step, i.e the mixing together (intermixing) of the Biosolids Cake and the alkali. Shearing as used herein has the objective of disintegrating/tearing apart organics and cellular structures. Shearing/aggressive shearing is a much much more energy intensive process than mixing.

Saturation as used herein in relation to pH is the condition where there is an excess of alkali in the mixture beyond the point of ready solubility, thus being immediately available for the hydrolysis reaction to proceed vigorously. Due to fluctuations in material compositions and temperature saturation is typically represented by a pH of 10.0 to 13.0 at these process temperatures.

The scope of the present disclosure is by way of example rather than by way of limitation, and the subject disclosure does not preclude inclusion of such modifications, variations, and/or additions to the present subject matter as would be readily apparent to he person skilled in the art.

I claim:

1. A procedure for producing a liquid fertilizing product from a biosolids cake including hydrolysable material and water by hydrolysis of the hydrolysable material, the biosolids cake having a total biosolids content of 18% or more by weight, the procedure comprising:
    (a) positioning a process amount of the biosolids cake in a reactor vessel;
    (b) thermally treating the process amount of the biosolids cake in the reactor vessel by heating the process amount to an elevated reaction temperature between 75° C. and a maximum temperature under 100° C.;
(c) adding an initial quantity of an alkali sufficient to provide an initial saturated solution of the alkali and undissolved alkali that is not dissolved in the water, and mixing the initial quantity of the alkali and the process amount of the biosolids cake to form a reactor mixture comprising the hydrolysable material and the water in the reactor vessel having an initial pH of at least 11.5 and the initial excess amount of the alkali;
(d) incubating the reactor mixture in the reactor vessel for an incubation time period, to at least partially hydrolyze the hydrolysable material;
(e) after the incubation time period, cooling the reactor mixture for a cooling period to an ambient temperature for further hydrolysis of the hydrolysable material:

wherein the fertilizing product has a viscosity not greater than 10,000cP is provided by hydrolyzing the hydrolysable material; and wherein, after the commencement of the incubation time period, at least one additional amount of the alkali is added to the reactor mixture during the incubation time period, said at least one additional amount being sufficient to provide a saturated solution of the alkali and undissolved alkali that is not dissolved in the water.

2. A procedure for producing a liquid fertilizing product from a biosolids cake including hydrolysable material and water by hydrolysis of the hydrolysable material, the biosolids cake having a total biosolids content of 18% or more by weight, the procedure comprising:

(a) positioning a process amount of the biosolids cake in a reactor vessel;
(b) thermally treating the process amount of the biosolids cake in the reactor vessel by heating the process amount to an elevated reaction temperature between 75° C. and a maximum temperature under 100° C.;
(c) adding an initial quantity of an alkali sufficient to provide an initial saturated solution of the alkali and undissolved alkali that is not dissolved in the water, and mixing the initial quantity of the alkali and the process amount of the biosolids cake to form a reactor mixture comprising the hydrolysable material and the water in the reactor vessel having an initial pH of at least 11.5 and the initial excess amount of the alkali;
(d) incubating the reactor mixture in the reactor vessel for an incubation time period, to at least partially hydrolyze the hydrolysable material;
(e) after the incubation time period, cooling the reactor mixture for a cooling period to an ambient temperature for further hydrolysis of the hydrolysable material:

wherein the fertilizing product has a viscosity not greater than 10,000cP is provided by hydrolyzing the hydrolysable material; and after the commencement of the cooling period, at least one further amount of the alkali is added to the reactor mixture during the cooling period, said at least one further amount being sufficient to provide a saturated solution of the alkali and undissolved alkali that is not dissolved in the water.

* * * * *